United States Patent

[11] 3,582,093

[72] Inventor Rene Lucien
 Hauts De Seine, France
[21] Appl. No. 787,402
[22] Filed Dec. 27, 1968
[45] Patented June 1, 1971
[73] Assignee Messier
 Paris, France
[32] Priority Jan. 9, 1968
[33] France
[31] 135,394

[54] FLUIDTIGHT SLIDING JOINT FOR A MOVING MEMBER, ADAPTED FOR USE AT HIGH WORKING TEMPERATURES AND PRESSURES
9 Claims, 12 Drawing Figs.

[52] U.S. Cl. ................................................. 277/177,
 277/188
[51] Int. Cl. ................................................. F16j 9/00,
 F16j 15/00
[50] Field of Search ........................................ 277/188,
 176, 177, 220, 222

[56] References Cited
UNITED STATES PATENTS
2,797,971 7/1957 Greenough.................. 277/188X
2,962,332 11/1960 Hale............................ 277/220X
3,071,386 1/1963 Scannell...................... 277/177
3,373,999 3/1968 Jepsen......................... 277/222X

*Primary Examiner*—Samuel B. Rothberg
*Attorney*—Waters, Roditi, Schwartz & Nissen

ABSTRACT: A fluidtight sliding joint for a moving member, adapted for use at high working temperatures and pressures, and comprising a sealing ring made of an elastomer, this ring having a substantially rectangular axial section and, on the side of the sealing ring opposite to the direction of application of the hydraulic pressure, or on each side of said sealing ring, depending on whether the joint is single acting or double acting, an assembly of rings is provided to prevent extrusion of the elastomer. The assembly comprises a supporting ring of hard material resistant to extrusion and an intercalated ring of a material having a hardness and an elasticity intermediate between those of the supporting ring and those of the sealing ring. The supporting ring is in contact by one substantially flat face thereof with a lateral wall of the housing of said joint, while the intercalated ring is interposed between the sealing ring and the supporting ring. The intercalated ring has two substantially flat lateral faces, parallel to each other and inclined with respect to the lateral faces of the sealing ring, and in contact by one of the lateral faces with one flat face of the supporting ring.

PATENTED JUN 1 1971 3,582,093
SHEET 1 OF 2
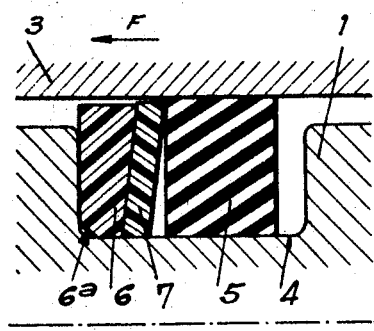
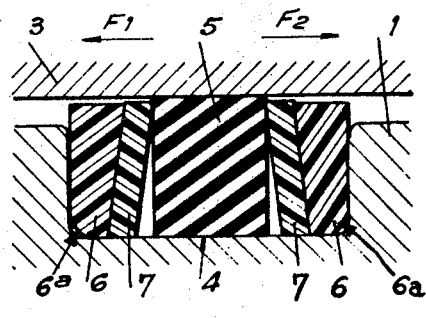
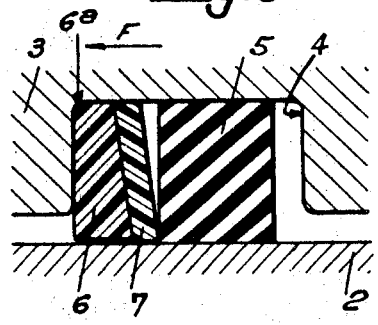
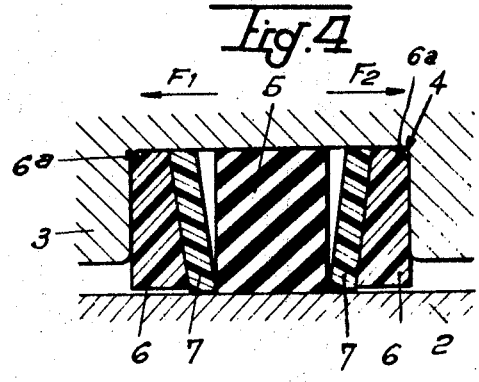
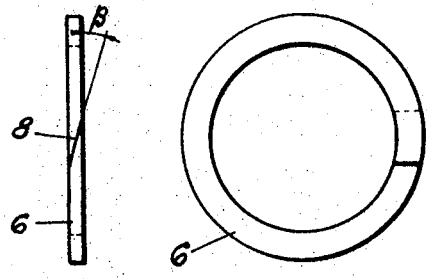
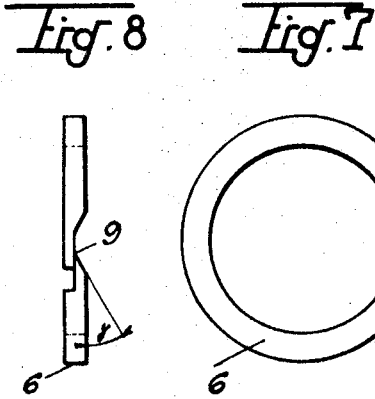
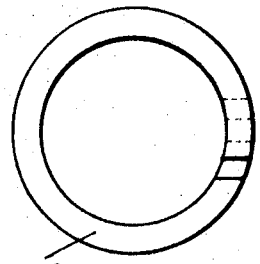

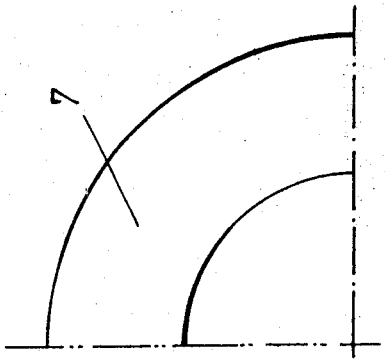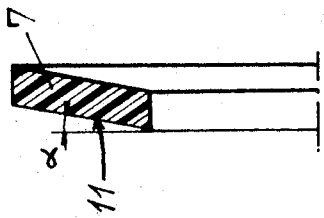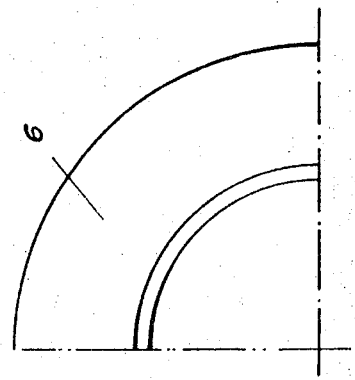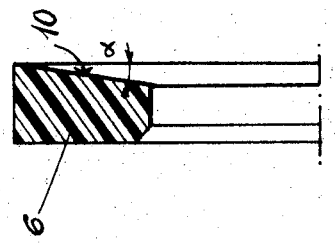

FLUIDTIGHT SLIDING JOINT FOR A MOVING MEMBER, ADAPTED FOR USE AT HIGH WORKING TEMPERATURES AND PRESSURES

The present invention relates to a fluidtight sliding joint intended to be fitted on a moving member such as a piston or a rod, for the purpose of hydraulic applications, under conditions in which high pressures and high temperatures exist simultaneously.

Over the ranges of temperature for which the physicochemical properties of elastomers permit the use of these materials in the presence of certain hydraulic liquids, these materials offer great advantages due to the perfect sealing which they provide and due to the absence of requirements of geometrical and metallurgical conditions which are imposed by metallic joints, for example.

At high temperatures however, the mechanical properties of all elastomers are substantially modified, in particular their modulus of elasticity, their resistance to creep and their resistance to abrasion, and under particularly severe conditions of use, studies carried out by the applicant have shown that it becomes necessary to supplement elastomer rings with means which prevent their extrusion in an effective manner. It is these means which more particularly distinguish the sealing joint according to the present invention from known joints.

In consequence, this joint is essentially characterized in that it comprises a sealing ring made of an elastomer, the said sealing ring having a substantially rectangular axial section, and on at least one side of the said sealing ring there is provided means for preventing the extrusion of this ring, said means comprising a supporting ring of hard material resistant to extrusion and an intercalated ring of a material having a hardness and elasticity between that of the said supporting ring and that of the said sealing ring, the said supporting ring being in contact by a generally flat face thereof with a flat lateral wall of the housing of the joint, while the said intercalated ring is interposed between the said supporting ring and the sealing ring, the said intercalated ring having an axial section in the form of a parallelogram inclined in the direction of the said sealing ring and supported by a generally flat lateral face thereof against a generally flat lateral face of the said supporting ring.

According to an essential characteristic of the invention, the surface of the supporting ring directed towards the intercalated ring has a taper which forms with the plane of the ring an angle preferably comprised between about 7° and 15°, so that the hydraulic pressure applied on the elements of the joint acts radially on the said supporting ring and applies it firmly against the surface to be sealed. The surface of the intercalated ring facing the supporting ring has preferably a profile which is complementary to this latter.

According to another important characteristic of the invention, the supporting rings and the intercalated rings are slit at one extremity of a diametral plane, in order to have a sufficient degree of freedom to permit their expansion or their contraction. These slots may, for example, be arranged obliquely with respect to a plane perpendicular to the axis of the ring and may form with the latter for example, an angle of about 20°. In the case of the supporting ring, the said slots may also form a baffle.

Again according to an important characteristic of the invention, a chamfer is provided on the edge of the supporting rings contiguous to the coupling surface of a lateral wall and the bottom of the groove in which the joint is housed, in order to avoid abnormal forces on the said ring and possible interference between the said edge and the said coupling surface, which is generally rounded.

The sealing ring may have any conventional shape whatever, the means employed for preventing extrusion having proved effective in all cases, during the course of repeated tests. A ring of rectangular section has however certain advantages, since it lends itself little to the deformations of the elastomer under the effect of the pressure and in consequence opposes deterioration by fatigue.

The materials in which the sealing ring, the supporting ring or rings and the intercalated ring or rings, of the sealing joint according to the invention are made are naturally chosen in dependence on the conditions of use of this joint.

The constituent material of the sealing ring must in particular be compatible with the hydraulic liquid employed under the conditions of use of the joint. There may be employed, for example, copolymers of butadiene and acrylic nitrile, polymers of chloroprene (for example that marketed commercially by the du Pont de Nemours Company under the trademark "neoprene"), copolymers of vinylidene fluoride and hexafluoropropene (for example that sold commercially under the trademark "Viton" by the du Pont de Nemours Company.

The supporting rings, the function of which is to shape themselves to the macrogeometry of the surface to be sealed during the course of the relative displacements of the parts and/or the variations of pressure, must be made of a material which has a modulus of elasticity and a resistance to creep which are sufficient, under the conditions of use, to permit only limited and elastic deformations of the ring, without any possibility of extrusion into the hollows of the surrounding parts.

The coefficient of friction of this material on the surface to be sealed should preferably be as low as possible. As suitable materials, there may be cited for example the acetal resins (for example the resins sold under the trademark "Delrin" by the du Pont de Nemours Company) pure or charged, or the polyamide resins, charged with graphite or not, these latter resulting in friction which is still lower than the acetal resins. The so-called "thermo-stable" resins such as the resins of polycarbonates, polyphenylene-oxide polysulphones, polyimides, etc., may also be utilized, but this list is of course not limitative.

The intercalated rings must be of a material which is at the same time sufficiently rigid so that it is not extruded into the microscopic clearances existing between the supporting rings and the surface to be sealed, and sufficiently flexible so as to be intimately applied against the surface to be sealed, so as to prevent any extrusion of the sealing ring of elastomer. In addition, the intercalated rings must prevent any contact between the sealing rings and the supporting rings, the hardness coefficients of which are very different, in order to prevent any damage to the sealing ring, and they must have a hardness between those of the sealing and supporting rings. In consequence, they will be made of a material having a fairly low modulus of elasticity, of the order of 5,000 to 6,000 daN/sq.cm. for example and having in addition a certain facility of adaptation by creep and good friction characteristics. Polytetrafluoroethylene (for example the product sold commercially under the trademark "Teflon" by the du Pont de Nemours Company), pure or moderately charged, especially with graphite, glass or molybdenum bisulphide, has proved to be particularly satisfactory for this application.

Various forms of embodiment of the invention will now be described in detail, by way of nonlimitative examples, reference being made to the accompanying drawings, in which:

FIGS. 1 and 2 are diagrammatic views in axial section of two piston joints, single acting and double acting respectively;

FIGS. 3 and 4 are diagrammatic views in axial section of two rod joints, respectively single acting and double acting;

FIGS. 5 and 6 are diagrammatic views of a supporting ring or an intercalated ring with an oblique slot, taken respectively along the axis of the ring and perpendicular to that axis;

FIGS. 7 and 8 are diagrammatic views of a supporting ring with a baffle slot, taken respectively along the axis of the ring and perpendicular to that axis;

FIGS. 9 and 10 are partial detail views of a supporting ring, shown respectively in axial section and in plan;

FIGS. 11 and 12 are views of an intercalated ring, similar to FIGS. 9 and 10.

Referring first of all to FIGS. 1 to 4:

A piston 1 or rod 2 slides in a cylinder 3 containing a hydraulic liquid, the pressure of which is applied in the direction of the arrow F in the case of a single-acting piston or rod (FIG. 1 and 3), or alternatively in the direction of the arrows $F_1$ and $F_2$ (FIGS. 2 and 4) in the case of a double-acting piston or rod. The joint in accordance with the invention is housed in an annular groove 4, formed either in the piston (FIGS. 1 and 2) or in the cylinder (FIGS. 3 and 4).

This joint comprises essentially a sealing ring 5 on one side or on both sides of which, depending on whether the piston or the rod is single acting or double acting, there are arranged a ring 6 supported against one wall of the groove 4, and an intercalated ring 7 interposed between the rings 5 and 6. The nature of the materials of which the rings 5, 6 and 7 are constituted has already been indicated above, together with their respective functions.

As has already been indicated and as shown in FIGS. 1 to 4, the supporting ring 6 comprises a chamfer 6a, facing the rounded surface by which the wall contiguous to the groove 4 is connected to the bottom of this groove.

It has also already been indicated that the supporting ring 6 and intercalated ring 7 are slotted diametrically for the purpose of lending themselves to expansion or contraction. FIGS. 5 and 6 show a type of slot which is particularly well adapted to this application, the slot 8 being directed obliquely with respect to the central plane of the ring and forming with this latter an angle $\beta$, of the order of 20°.

FIGS. 7 and 8 also show another type of baffle slot which can be used for the supporting rings 6. In this alternative form, the parts of the ring which limit the slot 9 overlap partly so as to form a baffle. It will be noted that the extremities of these parts are chamfered on the side of the intercalated ring 7, the angle $\gamma$ of the chamfer and the plane of the ring being comprised between about 30° and 45°.

In certain applications, it is possible to dispense with the provision of slots in the rings 6 and 7, without thereby departing from the scope of the invention.

In order that the supporting rings 6 may be intimately applied against the surface to be sealed, a taper 10 (FIGS. 9 and 10) is provided on these rings on the side of the intercalated ring 7. The angle $\alpha$ of this taper portion with the plane of the ring is preferably of the order of 7° to 15°, depending on the coefficient of friction of the ring 6 on the side of the groove 4 in order to prevent the application of an excessive force which would accentuate the rate of wear of the ring.

In a similar manner, the intercalated ring 7 preferably comprises, on the side of the supporting ring 6, a countertaper 11 also forming an angle $\alpha$ with the plane of the ring, so as to present a profile which is complementary to that of the corresponding face of the supporting ring 6 and a perfect application, over its whole thickness, of the intercalated ring 7 against the surface to be sealed. This arrangement becomes necessary in order to prevent any extrusion of the sealing ring 5, as soon as the thickness of the ring 7 exceeds a certain value, for example of the order of 0.4 to 0.8 mm. in the tests carried out by the Applicants on different forms of construction.

An example of construction of a sealing joint according to the invention will now be described in detail below. This example is only intended to illustrate the invention and has of course no limitative nature.

EXAMPLE

This example relates to a joint for a double-acting piston of the same type as that shown in FIG. 2.

The housing of this joint was a standard groove for a toric joint having a double backing ring of polytetrafluoroethylene. The working conditions were as follows:

Temperature     −25° to +120° C.
Pressure     280 bars
Hydraulic liquid: poly-siloxane for high temperatures, with different additives sold commercially under the trademark "Oronite" M2V by the Chevron Chemical Company.

Travel     440 mm.
Diametral swelling of the cylinder under pressure: 0.25 mm.
The important working characteristics of the elements of the joint were as follows:
Diameter of bore     90 mm.
Width of groove     10.9 mm.
Sealing ring:
    Material: Viton (trademark) with a hardness of 80 Shore A
    Section: Rectangular, without chamfer.
    Thickness: 4 mm. (dimension parallel to its axis)
    Standard tightness on the cylinder: 0.70 mm.
Supporting rings:
    Material: Polyamide (trademark "Nylon Technyl A208" of the Societe Rhodiaceta).
    External diameter before slot: 90.3 mm.
    Maximum thickness: 1.9 mm.
    Taper angle $\alpha = 8°A$
    Straight slot at 22° of the type shown in FIGS. 5 and 6.
Intercalated rings:
    Material: Polytetrafluoroethylene, pure.
    External diameter before slot: 90.3 mm.
    Thickness: 0.8 mm.
    Parallelogram section, countertaper $\alpha = 8°A$
    Slot at 22° of the same type as that shown in FIGS. 5 and 6.

This type of joint has enabled endurance without leakage of 15,000 to 20,000 cycles with unitary forces of 50 to 100 daN. It can be utilized at temperatures below −40°C. if it is completed by a secondary stage leakage recovery at low pressure.

The substitution in this joint of a sealing ring of nitrile elastomer with a hardness of Shore A80 instead of "Viton" resulted, under the same conditions, in an operation without leakage down to a temperature of less than −40°C.

The substitution in the same joint of supporting rings of polyacetal resin (type Delrin 150 of the du Pont de Nemours Company) instead of polyamide gave comparable results under the same conditions, but with higher values of friction, of the order of 100 to 150 daN.

I claim:

1. A fluidtight sliding joint for two relatively movable members, one of which has a housing receiving the joint, said joint being adapted to be utilized at high temperatures and pressures and comprising a sealing ring constituted of an elastomer, said sealing ring having a substantially rectangular axial section, and means on one side of said sealing ring for preventing extrusion of said ring, said means comprising a supporting ring of a hard material resistant to extrusion and an intercalated ring of a material having a hardness and an elasticity between those of the said supporting ring and those of said sealing ring, said supporting ring being in contact by a generally flat face thereof with a flat lateral wall of the housing for said joint, while said intercalated ring is interposed between said supporting ring and said sealing ring, said intercalated ring having an axial section in the form of a parallelogram inclined in the direction of said sealing ring and supported by a generally flat lateral face thereof against a generally flat lateral face of said supporting ring.

2. A fluidtight sliding joint for two relatively movable members one of which has a housing receiving the joint, said joint being adapted for utilization at high temperatures and pressures and comprising a sealing ring constituted of an elastomer, said sealing ring having a substantially rectangular axial section, and means on each side of said sealing ring, for preventing extrusion of said ring, said means comprising a supporting ring of hard material resistant to extrusion and an intercalated ring of a material having a hardness and elasticity between those of said supporting ring and those of said sealing ring, said supporting ring being in contact by a generally flat face thereof with a flat lateral wall of the housing for said joint, while said intercalated ring is interposed between said supporting ring and said sealing ring, said intercalated ring having an axial section in the form of a parallelogram inclined in the direction of said sealing ring and supported by a generally flat lateral face thereof against a generally flat lateral face of said supporting ring.

3. A fluidtight joint as claimed in claim 1, in which the lateral face of said intercalated ring which is in contact with said supporting ring, is provided in its portion farthest removed from the geometric axis of said intercalated ring, with a taper forming with a plane perpendicular to said axis an angle comprised between 7° and 15°, the corresponding face of said supporting ring having a complementary profile, so that the hydraulic pressure applied to said supporting ring urges this latter radially and applies it firmly against the surface to be rendered fluidtight.

4. A fluidtight joint as claimed in claim 1, in which at least one of said supporting and intercalated rings is slit along a diametral plane, so as to have a sufficient degree of freedom for the purpose of expansion or contraction.

5. A fluidtight joint as claimed in claim 1, in which at least one of said supporting and intercalated rings is slit along a radial plane disposed obliquely with respect to the lateral faces by which said rings are in contact and forming with said lateral faces an angle of about 20° so as to provide a sufficient degree of freedom for the purposes of expansion and contraction.

6. A fluidtight joint as claimed in claim 1, in which said supporting ring is slit, the parts of said supporting ring contiguous with the slit overlapping each other so as to form a baffle.

7. A fluidtight joint as claimed in claim 6, in which the parts of said supporting ring contiguous with said slit forming a baffle are chamfered on their faces turned towards said intercalated ring, the angle of the chamfer of each of said parts forming with said face turned towards said intercalated ring an angle being comprised between about 30° and 45°.

8. A fluidtight joint as claimed in claim 1, in which the face by which said supporting ring is in contact with a wall of the housing of said joint is chamfered in its portion closest to the axis of said supporting ring.

9. A fluidtight joint as claimed in claim 2 in which said supporting ring is slit, the parts of said supporting ring contiguous with the slit overlapping each other so as to form a baffle and being chamfered on their faces turned towards said intercalated ring, the angle of the chamfer of each of said parts forming with said face turned towards said intercalated ring an angle being comprised between about 30° and 45°.